Nov. 6, 1928.
L. F. CURTIS
1,690,670
ILLUMINATED DIAL
Filed Oct. 11, 1926
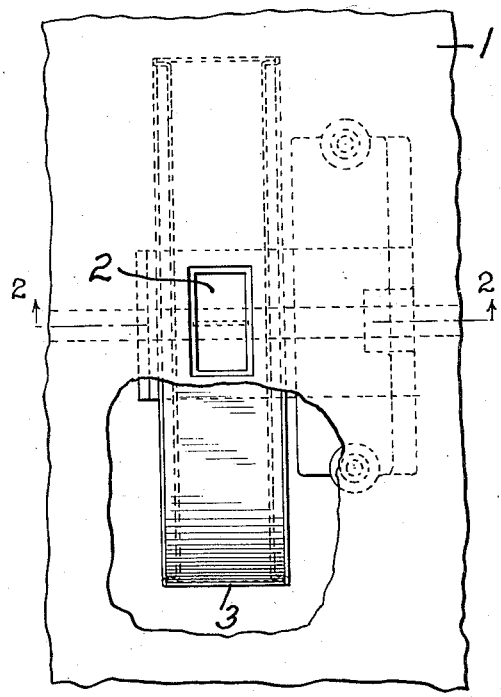
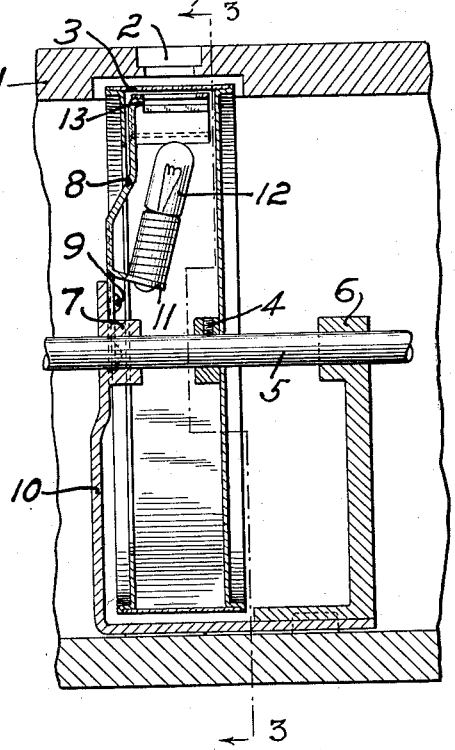
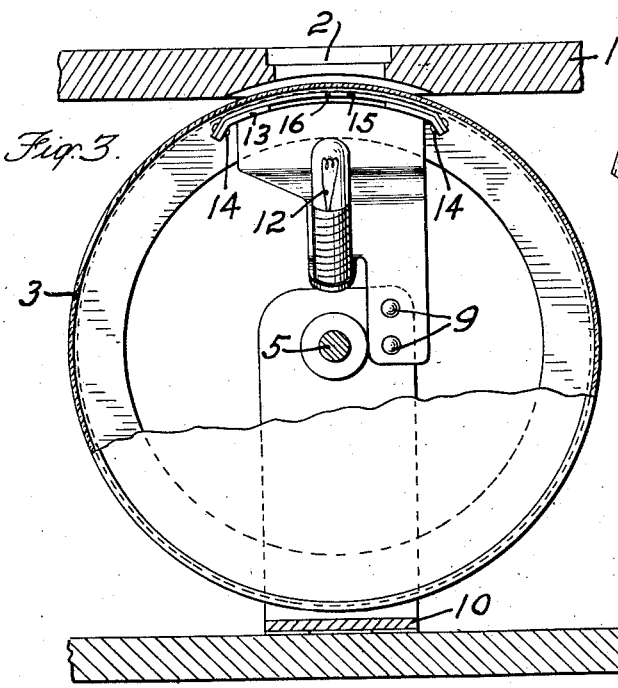
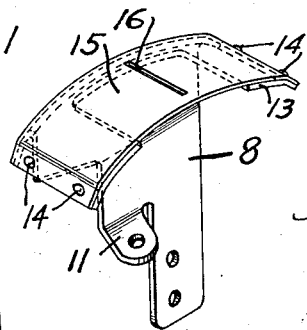
INVENTOR.
Leslie F. Curtis
BY
ATTORNEY Patented Nov. 6, 1928.

1,690,670

UNITED STATES PATENT OFFICE.

LESLIE F. CURTIS, OF SPRINGFIELD, MASSACHUSETTS, ASSIGNOR TO AMERICAN BOSCH MAGNETO CORPORATION, OF SPRINGFIELD, MASSACHUSETTS, A CORPORATION OF NEW YORK.

ILLUMINATED DIAL.

Application filed October 11, 1926. Serial No 140,743.

The present invention relates to illuminated dials for various instruments and devices and particularly to arrangements in which a stationary indicating line is produced on a movable dial at the scale indication to be read thereon.

In some prior arrangements for illuminating such movable dials a portion of the scale is flooded with light and the readings are made between pointers or under a hair line. The pointers are not continuous across the scale and the hair line introduces parallax, so that both arrangements are apt to be inconvenient and inaccurate.

In accordance with my invention, a stationary indicating line of light or shadow is produced across and directly on the scale of the movable dial and if desired a portion of the scale on either or both sides of the indication may be illuminated contrastingly in color or intensity from the same source of light. Preferably the dial is rotatable translucent and of circular form, and the source of light is arranged below the exposed portion of the dial with a shield located in proximity to the under side of the dial in the path of the rays of light from the source to the dial. If the indication on the dial is to be a line of light, the shield may either be opaque and have a translucent line or a transparent line or an open slit across it, or else the shield may be translucent with a transparent line or an open slit across it. On the other hand, if the indication is to be a line of shadow, the shield is translucent or transparent with a hair line or an indicating edge across it, or else is opaque with a hair line across an opening in the shield or an indicating edge formed by an opening. In any of these forms of construction I prefer to use a stationary bracket supporting the source of light in the form of an incandescent lamp, and also supporting a shield conforming in contour to the dial. Also, in the case of radio receiving sets and other devices, I prefer to use an opaque cover provided with a window over the indicating portion of the dial.

In the accompanying drawings illustrating as an example the application of the preferred form of my invention to a radio receiving set having a single indicating dial, Fig. 1 is a top view of the cabinet with a portion broken away to show the dial; Fig. 2 is a section on line 2—2 of Fig. 1; Fig. 3 is a section on line 3—3 of Fig. 3; and Fig. 4 is a perspective view of the bracket.

The cover 1 has an open window 2 over a circular dial 3 of translucent celluloid with scale dimensions of the usual kind thereon. The dial is fastened at 4 for rotation on the shaft 5 which is turned in bearings 6 and 7 with the condenser rotors by a tuning knob (not shown). The bracket 8 is fastened at 9 to the stationary frame 10, and has a bent-up portion 11 for mounting the incandescent lamp 12, and also has a cut-away peripheral portion 13 for attachment at 14 to the shield 15. The shield is of translucent celluloid having an open slit at 16 in close proximity to the under side of the dial 3 and in the path of the rays of light from the lamp 12 to the dial.

When the lamp 12 is supplied with electric current from a source (not shown), a stationary indicating line of light is projected through the slit 16 onto the dial at 17 in a field of contrasting illumination appearing over the entire portion of the dial that is observable through the window 2. As the dial is positioned, the stationary line of light is clearly observable through the window 2 for accurate readings on the scale, irrespective of the position of the eye of the observer.

Having thus described my invention, what I claim is:

1. In a device of the kind described, a movable translucent dial, a stationary source of light, and a stationary line indicator arranged in the path of the rays of light from the source to the underside of the dial.

2. In a device of the kind described, a movable translucent dial, a stationary source of light, and a stationary line indicator arranged in proximity to the under side of the dial in the path of the rays of light from the source to the dial.

3. In a device of the kind described, a movable translucent dial, a stationary source of light, and a stationary shield having a transparent line in the path of the rays of light from the source to the dial, whereby a stationary indicating line of light is produced on the dial.

4. In a device of the kind described, a movable translucent dial, a stationary source of light, and a stationary shield arranged between the source of light and the dial and having an open slit across it, whereby a stationary indicating line of light is produced on the dial.

5. In a device of the kind described, a movable translucent dial, a stationary source of light, and a stationary shield permitting the passage of light therethrough and being arranged in the path of the rays of light from the source to the dial, said shield having an indicating line across it, whereby a stationary indicating line is produced on the dial in a field of contrasting illumination.

6. In a device of the kind described, a movable dial permitting the passage of light therethrough, a stationary source of light, and a stationary shield arranged in proximity to the under side of the dial in the path of the rays of light from the source to the dial, said shield being translucent and having a transparent indicating line across it, whereby a stationary indicating line of light is produced on the dial in a field of contrasting illumination.

7. In a device of the kind described, a rotatable dial permitting the passage of light therethrough, a stationary source of light arranged within the dial, a stationary shield arranged in proximity to the under side of the dial between it and the source of light, said shield being translucent and having an open slit across it, and an opaque cover for the dial having a window enclosing the indicating portion of the dial, whereby a stationary indicating line of light is produced in a field of contrasting illumination on the portion of the dial enclosed by the window.

8. In a device of the kind described, a movable translucent dial, a stationary bracket, an incandescent lamp fastened to the bracket, and a shield fastened to the bracket between the lamp and the dial and having a line indicator arranged in the path of the rays of light from the lamp to the dial.

9. In a device of the kind described, a rotatable dial permitting the passage of light therethrough, a stationary bracket arranged within the dial, an incandescent lamp fastened to the bracket, a translucent shield in proximity to the under side of the dial in the path of the rays of light from the lamp to the dial, said shield having an open slit across it, and an opaque cover for the dial having a window enclosing the indicating portion of the dial, whereby a stationary indicating line of light is produced in a field of contrasting illumination on the portion of the dial enclosed by the window.

10. The combination with a non-transparent dial, of a source of illumination, and a slitted translucent member disposed between said source and dial.

In testimony whereof I affix my signature.

LESLIE F. CURTIS.